United States Patent
Kurz et al.

(10) Patent No.: US 6,449,572 B1
(45) Date of Patent: Sep. 10, 2002

(54) METHOD AND DEVICE FOR CLASSIFYING THE DRIVING STYLE OF A DRIVER IN A MOTOR VEHICLE

(75) Inventors: Gerhard Kurz, Wendlingen; Armin Müller, Gechingen; Thomas Röhrig-Gericke, Weil im Schöubuch; Reinhold Schöb, Gäufelden; Harry Tröster, Tamm; Andy Yap, Böblingen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/471,588

(22) Filed: Dec. 23, 1999

(30) Foreign Application Priority Data

Dec. 27, 1998 (DE) .......................................... 198 60 248

(51) Int. Cl.$^7$ ................................................ G06F 3/00
(52) U.S. Cl. ............................. 702/94; 702/92; 702/93; 702/95
(58) Field of Search ............................. 702/92, 93, 95, 702/94, 116, 175; 382/104; 701/58, 49

(56) References Cited

U.S. PATENT DOCUMENTS

| 4,829,434 A | | 5/1989 | Karmel et al. ............ 364/424.1 |
| 6,125,314 A | * | 9/2000 | Graf et al. ...................... 701/53 |
| 6,175,786 B1 | * | 1/2001 | Takakura et al. .............. 701/29 |
| 6,188,945 B1 | * | 2/2001 | Graf et al. ...................... 701/58 |
| 6,311,114 B1 | * | 10/2001 | Graf et al. ...................... 701/57 |

FOREIGN PATENT DOCUMENTS

| DE | 42 15 406 A1 | 5/1992 |
| DE | 44 01 416 C2 | 1/1994 |
| EP | 0 635 742 A1 | 2/1995 |
| EP | 99123003.8 | 7/2000 |

* cited by examiner

Primary Examiner—Marc S. Hoff
Assistant Examiner—Felix Suarez
(74) Attorney, Agent, or Firm—Crowell & Moring LLP

(57) ABSTRACT

In a method for classifying the driving style of a driver in a motor vehicle, measured variables indicative of driving style are recorded and driving-style classification figures are determined by a comparison with reference values, parameter settings corresponding to the driving-style classification figures being carried out to adapt the functioning of a regulation and control unit.

In order to improve the handling of a motor vehicle with the aid of a driver classification, it is provided that presettings for the driving-style classification figures are stored in the regulation and control unit of the motor vehicle, it being possible to prescribe driving-style classification figures for a plurality of different driver reaction stages, and that the current driver is classified in a prescribed driver reaction stage in the motor vehicle by measuring classifying indicators, and driving-style classification figures corresponding to the driver reaction stage are activated in the regulation and control unit.

17 Claims, 1 Drawing Sheet

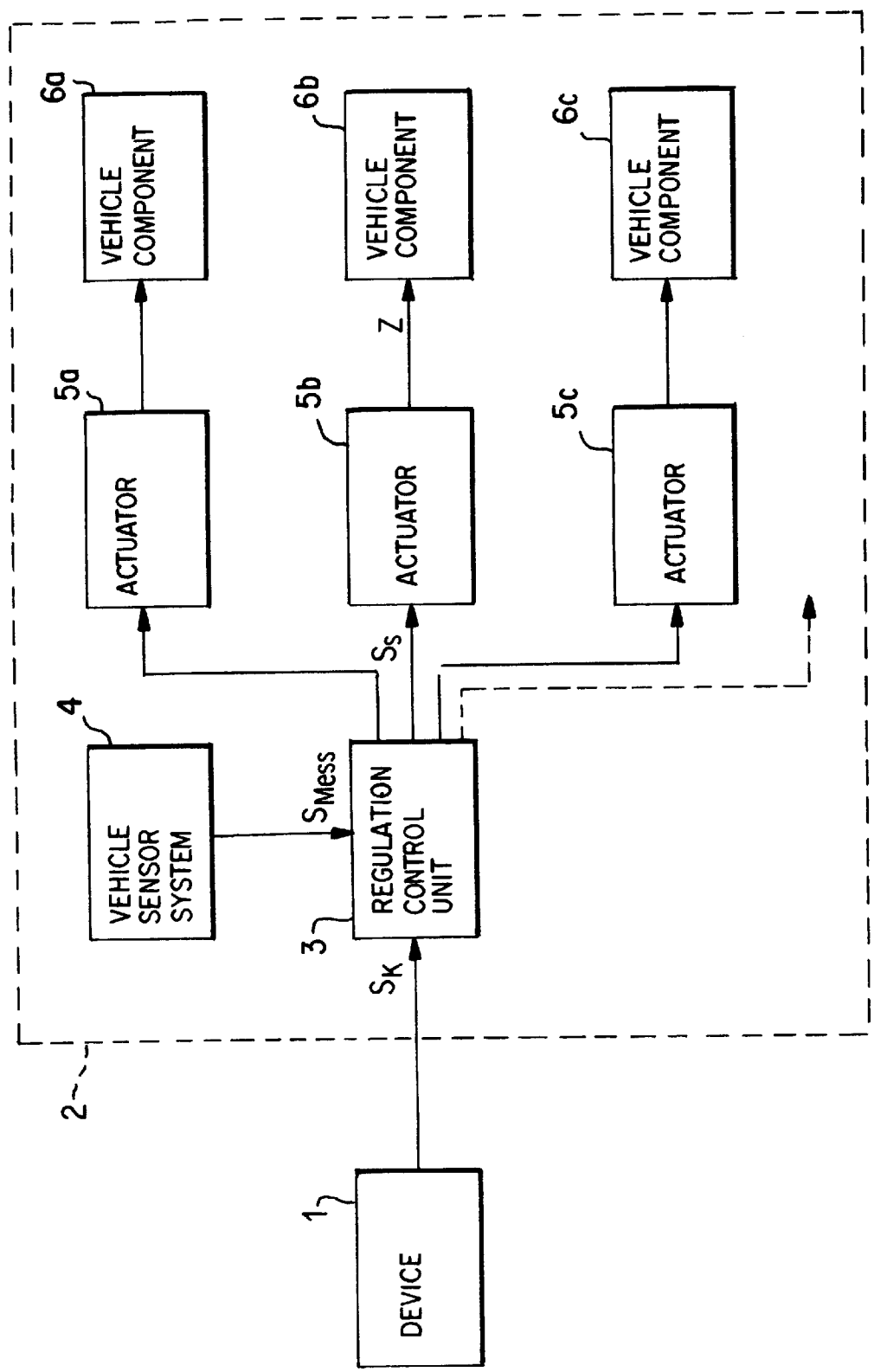

METHOD AND DEVICE FOR CLASSIFYING THE DRIVING STYLE OF A DRIVER IN A MOTOR VEHICLE

CROSS REFERENCE TO RELATED APPLICATIONS

Priority is claimed under 35 U.S.C. §119 with respect to German Patent Application No. 198 60 248.0-34 filed on Dec. 24, 1998.

BACKGROUND OF THE INVENTION

The invention relates to a method and device for classifying the driving style of the driver in a motor vehicle.

DE 44 01 416 C2 discloses a method for gradual driving style classification between steady and dynamic driving styles, in which during driving measured variables indicative of driving style are determined, and driving-style classification figures are calculated from the measured variables with the aid of a family of characteristics. These driving-style classification figures serve as a measure of whether a steady or a dynamic driving style is desired. Based on this claccification, parameters influencing the vehicle handling which are used to set the functioning of specific components of the vehicle, for example the antilock braking system, are calculated as a function of the driving-style classification figures and stored in a regulation and control unit.

In order to obtain a reliable classification and adaptation of the regulation and control unit to the respective driving style, the driving style is classified separately with regard to the acceleration behaviour, the braking behaviour and the steering behaviour. This approach takes account of the fact that the driving style can be characterized more precisely and aptly using a plurality of classification figures than using only one classification figure, the result of this being to reduce the risk of erroneous decisions by the system.

Moreover, driver identification devices are known, for example from DE 42 15 406 A1, by means of which a driver can be classified continuously in accordance with his driving style from economic to sporty/performance-orientated, and the vehicle can be set in accordance with the classification.

The invention is based on the problem of improving the handling of a motor vehicle with the aid of a driver classification.

SUMMARY OF THE INVENTION

According to the novel method contemplated by the present invention for solving this problem the first step is to determine driving-style classification figures for a plurality of different driver reaction stages. These driving-style classification figures grouped according to reaction stages are transmitted to a regulation and control unit of the vehicle and stored there.

After each start of the motor vehicle, indicators are determined which automatically permit an identification and/or classification of the current driver by measuring classified parameters and operating or state variables. After the current driver has been identified and/or classified with the aid of these measured indicators, the driving-style classification figures corresponding to this driver and stored in the regulation and control unit are activated.

This mode of procedure has, for one thing, the advantage that each time driving is started a set of driving-style classification figures which best describes the respective driver is activated, and the vehicle can be set with reference to the person with each start. By activating the corresponding set of driving-style classification figures, it is possible for reaction deficits, for example excessively slow reaction or excessively hesitant braking, to be compensated by the regulation and control unit, and this enhances driving safety. Long learning phases in which the vehicle normally has a neutral basic behaviour as long as the regulation and control unit has not yet adapted to the respective driver are eliminated or minimized.

In accordance with an advantageous development, a coarse classification is undertaken into three reaction stages which correspond to an average driver, a driver with slow reactions and a quickly-reacting driver. Starting from this coarse classification, the driving-style classification figures are expediently continuously adapted during ongoing driving in the vehicle, in order to take account of particular situations such as night driving, driving in rain or snow, or different daily states of a driver, for example caused by overtiredness. The classification figures, and consequently also the vehicle handling, are adapted in the vehicle to the situation with the aid of this fine classification.

The classification of a driver is performed on the basis of typical driver reactions. It is possible to determine the variation and/or the change in state variables, for example the pressure build-up in the hydraulics of the brake system or the steering system, or else, accelerations/retardations of the vehicle. These state variables serve as an indicator for classifying the driver into an appropriate reaction type. This mode of procedure has the advantage that no further parameters are required to identify the driver. In the case of a coarse classification into three reaction stages, the driver is grouped into that reaction stage which best reflects his ability to react.

It can, however, also be expedient, if appropriate, to store person-specific classification figures for one or a plurality of drivers individually in the regulation and control unit of the vehicle, and to activate these person-specific classification figures after starting driving by identifying the current driver, as a result of which a vehicle used by a plurality of persons can be optimally set to the respective driver directly after starting. The determination of person-specific classification figures can be performed with the aid of selected test drives in the vehicle or by means of driving simulators. Typical indicators which can be used to identify the current driver are, for example, the seating position set by the driver, or the driver weight acting on the driver's seat.

BRIEF DESCRIPTION OF THE DRAWING

Further advantages and expedient embodiments are to be gathered from the further claims, the description of the FIGURE and the drawing, which represents a block diagram with the basic method steps.

DETAILED DESCRIPTION OF THE PREFERRED EMBODIMENT

Denoted by the reference 1 in the FIGURE is a device in which, with the aid of different driving manoeuvres, reaction times of a driver are measured and used to derive raw values of driving-style classification figures which characterize different driver reaction stages of different driver types. The driving-style classification figures are a measure of the driver's speed of reaction; the driving-style classification figures can be used to set parameters of various vehicle components such as, for example, an antilock braking system, in a driver-specific fashion, as a result of which the different reactions of various drivers can be taken into account in the technical units, and overhasty or excessively slow reactions can be at least partially compensated.

By means of suitable driving manoeuvres, driving-style classification figures are determined for the longitudinal and transverse dynamics of the vehicle, in particular for the acceleration, for the braking behaviour and the steering behaviour, and these classification figures are used to set those vehicle components which influence the acceleration, the retardation and the steering of the vehicle. Moreover, however, it is also possible to take account of further units of the vehicle, for example the suspension system.

It is possible to use as device 1 an optically and acoustically perceptible simulation, which can be represented entirely by computer, in a driving simulator, which can possibly be of restricted mobility. Moreover, however, it is also possible to use a real vehicle on a test stand and to measure the reaction times of the driver to different driving situations which are generated optically and/or acoustically. The use of a test vehicle and the measurement of reactions under real conditions also come into consideration.

Various driving manoeuvres are carried out in the device 1 at a given speed, in particular crossing over at junctions, overtaking manoeuvres, drastic braking, driving in convoy, taking account of crossing pedestrians etc. Moreover, it is also possible, in particular in driving simulators, to simulate driving situations in borderline areas, for example driving with impeded visibility and/or in bad weather (night driving, rain, fog, falling snow, black ice), driving on roadways of differing quality, driving forwards/backwards with visibility impeded by obstacles etc. The evaluation of a multiplicity of individual driving manoeuvres has the advantage that average values can be formed for the individual driving-style classification figures, and that extreme values caused by unusually quick or slow reactions influence the calculation of classification figures only indirectly.

A coarse classification into one of the three driver reaction stages of slow/average/quick is expediently undertaken in the device 1. The discretization of the data via the coarse classification has the advantage that there is a need to transmit to the vehicle only a reduced data record in which the classification figures corresponding to the respective classification and/or reaction stage are stored beforehand.

On the other hand, it can also be expedient, however, to dispense with a coarse classification and, instead of the coarse classification, transmit to the vehicle the exactly determined classification figures describing a specific person only. In this case, it is necessary to transmit an additional identification value characterizing the relevant person.

After conclusion of the determination of the person-specific driving-style classification figures, corresponding classification figure signals $S_K$ are transmitted to a regulation and control unit 3 of the vehicle 2, the information on the associated driver also being stored, as appropriate, in the regulation and control unit 3 in addition to the value of the classification figures and/or the division into classes.

In a subsequent step, after the activation of the regulation and control unit 3 has been triggered, for example, by actuating the ignition lock, by opening the vehicle door or by virtue of some other way of sensing a change of driver or a restarting of the vehicle, an identification of the driver and/or classification of the driver is carried out. The vehicle sensor system, denoted in general by the reference 4, is used to determine the person-specific driver parameters and/or driver indicators, and the latter are fed as measuring signals $S_{Mess}$ to the regulation and control unit 3, in which a comparison with the stored driver parameters is carried out, and after successful driver identification and/or driver classification, the driving-style classification figures corresponding to the instantaneous driver are activated. Changes in speed of the vehicle, changes in the pressure build-up of the hydraulics of the braking or steering system, and further parameters and state variables can be used as classifying indicators. On occasion when a specific driver is to be identified, the seating position set by the driver, the weight of the driver acting on the driver's seat, or other features useful for driver identification can be measured and compared with reference values.

In order, in the case of an erroneous driver identification and/or driver classification, to prevent wrong raw values or even none at all, being present for the classification figures, driving-style classification figures for average drivers are stored as presetting and are activated automatically at the start of a journey.

It is expedient for a permanently running fine tuning of the driving-style classification figures to be carried out in the regulation and control unit 3, in order to improve the raw values of the coarse classification and to take account of current situations. For this purpose, specific driver activities and/or the reaction of various vehicle components to driver activities are recorded and evaluated, for example the frequency and intensity of the actuation of the vehicle brake, the frequency of the use of electronically controlled vehicle components such as antilock braking system or traction slip control of similar, or the gradient in the pressure build-up in the hydraulic supply of the steering system or the brake system. The recording of the driver activities is performed either by measuring operating and state variables via the vehicle sensor system 4 and transferring them to the regulation and control unit 3, or directly in the regulation and control unit 3 by counting the actuating signals and/or pulses actuating the respective vehicle components.

The fine tuning can be performed with the aid of driving manoeuvres which differ from the coarse classification.

Starting from the current driving-style classification figures, actuating signals $S_s$ are generated in the regulation and control unit 3 and fed to the actuators 5 which are applied to vehicle components 6. The actuators 5 generate manipulated variables z which set the vehicle components to the desired value. In the exemplary embodiment, three actuators 5a, 5b, 5c with associated vehicle components 6a, 6b, 6c are provided, the throttle valve, the fuel injection, the brake or the steering coming into consideration as vehicle component to be set.

In a further refinement of the invention, it is possible to provide additional sensors which monitor the driver and/or the surroundings of the vehicle in order to enhance driving safety in dangerous situations by intervening in the handling of the vehicle.

It can be advantageous for this purpose to make use for measuring purposes of distance-measuring systems for sensing the distance between the vehicle and other vehicles or fixed obstacles, and/or to determine the relative speed from the changes in distance. This information can be used to determine the driver's capacity to react or be stressed, or generally for the purpose of assessing the readiness of a driver to drive, and therefore for the purpose influencing the driving style classification figures.

If the driver drops below a given minimum distance, or the relative speed in relation to other vehicles is too high for a given distance, the driving-style classification figures can be adapted in order to adapt the vehicle behaviour appropriately to the slowed down ability of the driver to react. Moreover, however, it is also possible to intervene directly in a vehicle component, for example the vehicle brake.

In the case of the use of visual detecting systems, it is possible to use as further parameters for classifying the state of the driver the start of a steering angle related to a specific radius and a specific vehicle speed.

In the case of the use of an alcohol sensor, it is possible to estimate the driver's alcohol level, and in the event of the overshooting of a limiting value, to institute measures to prevent driving, either by imposing limitations with regard to driving speed, or preventing the vehicle from being started and/or driven off. The alcohol sensor is expediently installed in the region of the steering wheel.

The foregoing discussion discloses and describes merely exemplary embodiments of the present invention. One skilled in the art will readily recognize from such discussion, and from the accompanying drawings and claims, that various changes and modifications can be made therein without departing from the spirit and scope of the invention as defined in the following claims.

What is claimed is:

1. Method for classifying the driving style of a driver in a motor vehicle, in which measured variables indicative of driving style are recorded and driving-style classification figures are determined by a comparison with reference values, parameter settings corresponding to the driving-style classification figures being carried out to adapt the functioning of a regulation and control unit said method comprising the steps of:

storing presettings for the driving-style classification figures in said regulation and control unit, wherein there exist driving-style classification figures for a plurality of different driver reaction stages, and classifying a current driver of the vehicle in a prescribed driver reaction stage by measuring classifying indicators, and activating driving-style classification figures corresponding to the driver reaction stage in the regulation and control unit.

2. Method according to claim 1 wherein said method includes the step of determining at least one driver-specific measured variable as a classifying indicator.

3. Method according to claim 1 wherein a change in one or more vehicle-describing state variables is determined as classifying indicator during driving of the motor vehicle.

4. Method according to claim 3, wherein the motor vehicle includes a hydraulic brake system and said method further comprises the step of determining a change in the pressure build-up in the hydraulics of the brake system.

5. Method according to claim 3 wherein the motor vehicle includes a hydraulic steering system and wherein said method further comprises the step of determining a change in the pressure build-up in the hydraulics of the steering system.

6. Method according to claim 3 wherein said method further comprises the step of determining changes in the speed of the motor vehicle.

7. Method according to claim 3 wherein an average spacing between the motor vehicle and at least one other object is measured and taken into account as a function of speed.

8. Method according to claim 3 wherein the method further comprises the step of determining the lateral spacing of the motor vehicle from lateral obstacles.

9. Method according to claim 3 wherein said method further comprises the step of determining the frequency of overtaking maneuvers.

10. Method according to claim 3 wherein the method further includes the step of determining the time from the detection of an obstacle by a sensor up to the reaction of the driver.

11. Method according to claim 1 wherein at least one driver-specific feature is determined as a classifying indicator in the vehicle for the purpose of identifying the current driver, said driver-specific reaction stages stored in the vehicle being activated after the identification.

12. Method according to claim 11 wherein the seating position set by the driver is determined as a classifying indicator.

13. Method according to claim 11 wherein the driver's weight acting on the driver's seat is determined as a classifying indicator.

14. Method according to claim 1 wherein a coarse classification into a plurality of driver reaction stages is undertaken as presetting.

15. Method according to claim 1 wherein an average driver reaction stage corresponding to an average driver is prescribed in the regulation and control unit as basic value as driving is being started.

16. Method according to claim 1 wherein while the vehicle is being driven, the driving-style classification figures are continuously matched in the motor vehicle to an instantaneous, current driving style of the driver.

17. Device for classifying the driving style of a driver in a motor vehicle comprising a motor vehicle sensor system for measuring signals indicative of driving style which can be compared with signals corresponding to reference values for generating driving-style classification figures to be stored in a regulation and control unit, signals corresponding to parameter settings being assigned to the driving classification figures for the purpose of adapting the functioning of the regulation and control unit wherein:

the regulation and control unit of the motor vehicle has stored therein previously determined driving-style classification figures for a plurality of different driver reaction stages; and the signal generator provides measuring signals ($S_{Mess}$) in the motor vehicle for the purpose of driver type classification and classification in the corresponding driver reaction stage.

* * * * *